Patented Sept. 14, 1937

2,093,214

UNITED STATES PATENT OFFICE 2,093,214

2-ACYLACETYLAMINOTHIAZOLE COMPOUNDS

Gerhard Schrader, Opladen, near Cologne, and Werner Zerweck, Frankfort - on - the - Main - Fechenheim, Germany, assignors to General Aniline Works, Inc., New York, N. Y., a corporation of Delaware No Drawing. Application September 2, 1933, Serial No. 688,060. In Germany September 9, 1932

8 Claims. (Cl. 260—44)

The present invention relates to new thiazole compounds suitable as coupling components in the manufacture of azodyestuffs, to waterinsoluble azodyestuffs prepared with the said new coupling components and to fibres dyed with these waterinsoluble azodyestuffs. More particularly the present invention relates to compounds which may be represented by the probable general formula:

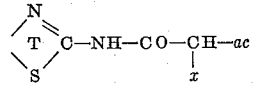

wherein

stands for the radical of a thiazole compound free from a group inducing solubility in water, such as a sulfonic or carboxylic acid group, that means

may stand for a thiazole nucleus which may bear non-solubilizing monovalent substituents, such as alkyl, alkoxy, halogen, the nitro group, the amino group, a substituted amino group, such as alkylamino or acetylamino; further

may represent a thiazole nucleus to which an arylene radical is condensed, for instance,

may stand for the radical of thiazole which is derived from an aminobenzene, aminonaphthalene, aminocarbazole, aminodiphenyleneoxide, aminodiphenylenesulfide, aminoacenaphthene, aminofluorenone, aminofluorene, aminocumarane, which amino compounds may bear non-solubilizing substituents, $x$ stands for a hydrogen atom or for the radical —N=N—R, wherein R means the radical of a diazotized primary amine suitable for producing an azodyestuff free from a group inducing solubility in water, for instance, for the radical of the benzene or napthalene series free from a sulfonic or carboxylic acid group which may bear as substituent, for instance, halogen, alkyl, alkoxy, the nitro group and a substituted amino group, and wherein $ac$ stands for an acyl radical, such as an acyl of the aliphatic or aromatic series, for instance, acetyl, propionyl, butyryl, benzoyl, chlorobenzoyl, methylbenzoyl, nitrobenzoyl and the like.

As is known from literature that the 2-aminoarylenethiazoles may react in the imino form, we include in our invention those compounds prepared according to the invention derived from 2-aminothiazole compounds in the imino form and which may be represented by the probable general formula:

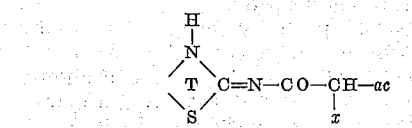

wherein the figures

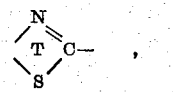

$x$ and $ac$ mean the same as stated above.

Those compounds in which $x$ stands for a hydrogen atom are obtainable by heating for a short time a 2-aminothiazole compound free from a group inducing solubility in water with an acylacetic acid ester, if desired, with the addition of a suitable solvent, such as chlorobenzene or xylene.

Our new coupling components are generally well-crystallizing, colorless substances, insoluble in water, soluble in organic solvents and aqueous alkalies.

The waterinsoluble azodyestuffs obtainable from those coupling compounds are prepared in the usual manner by diazotizing a diazotization component free from a group inducing solubility in water and coupling in substance or on a substratum with the coupling components identified above.

The dyestuffs prepared in substance are generally yellowish to brownish substances, suitable for preparing lakes fast to light. When produced on the fibre, especially the cellulosic fibre, according to the known methods of preparing ice colors, they generally yield yellow shades of good fastness properties.

The invention is illustrated by the following examples without being limited thereto:

*Example 1.*—75 parts by weight of 2-aminobenzothiazole of the melting point 129° C. are introduced, while stirring, into 225 parts by weight of acetoacetic ethyl ester which has been heated to 155–160° C. The 2-aminobenzothiazole enters into solution immediately. The temperature is kept for a quarter of an hour at 160° C. and after this, the reaction mixture is allowed to cool. The acetoacetyl-2-aminobenzothiazole of the formula:

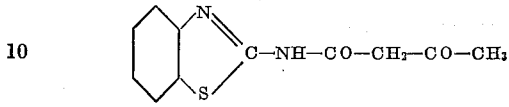

crystallizes in colorless needles, which after re-crystallizing from butanol melt at 223° C. with decomposition. The new thiazole compound is easily soluble in aqueous caustic soda solution.

*Example 2.*—20 parts by weight of 6-ethoxy-2-aminobenzothiazole of the melting point 164° C. are suspended with 80 parts by weight of benzoyl-acetic acid ester in a flask. The flask is then introduced into an oil bath heated to 210° C. The benzoyl-acetic acid ester soon begins to boil. After 15 minutes the reaction is complete. On cooling, the benzoylaceto-2-amino-6-ethoxybenzothiazole of the formula:

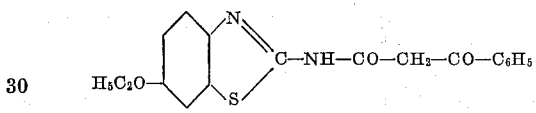

crystallizes in colorless needles of the melting point 211° C. It is rather difficultly soluble in aqueous caustic soda solution.

*Example 3.*—36.8 parts by weight of 6-chloro-2-aminobenzothiazole of the melting point 201° C. are dissolved in 250 parts by weight of chlorobenzene in a flask provided with a descending cooler. To the boiling solution there is slowly dropped in a mixture of 28 parts by weight of acetoacetic acid methyl ester and 50 parts by weight of chlorobenzene. When 90 parts by weight of ethylalcohol + chlorobenzene have distilled off, the reaction liquor is allowed to cool. The acetoacetyl-2-amino-6-chlorobenzothiazole crystallizing and having the following formula:

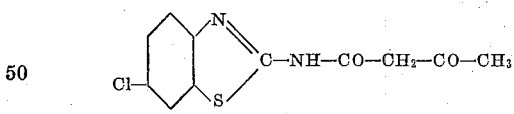

melts after recrystallizing from butanol at 264° C. with decomposition. It is easily soluble in aqueous caustic soda solution.

*Example 4.*—100 parts by weight of 6-methoxy-2-aminobenzothiazole of the melting point 146° C. are suspended in 250 parts by weight of acetoacetic acid ethyl ester. The flask is introduced into an oil bath which has been heated to 210° C. The 2-amino-6-methoxybenzothiazole enters into solution, whereby the acetoacetic acid ester begins to boil. The solution is kept boiling for about 10 minutes and is then allowed to cool. The acetoacetyl-2-amino-6-methoxybenzothiazole of the probable formula:

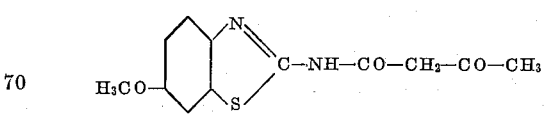

crystallized out melts after recrystallization from butanol at 206° C.

In an analogous manner there have been prepared the following acylacetyl-2-aminobenzothiazoles:

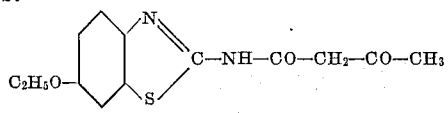

after recrystallization from butanol melting at 205° C. with decomposition.

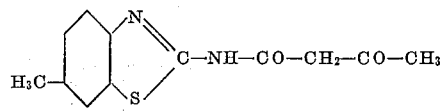

after recrystallization from butanol melting at 232° C. with decomposition.

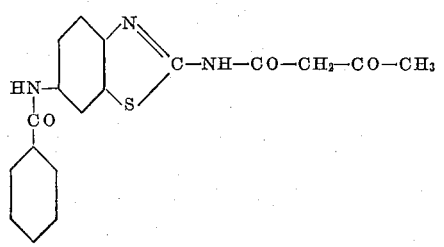

after recrystallization from butanol melting at 212° C. with decomposition.

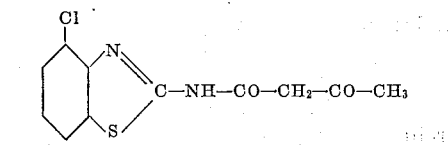

after recrystallization from butanol melting at 230° C.

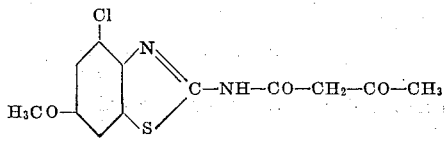

after recrystallization from butanol melting at 204° C.

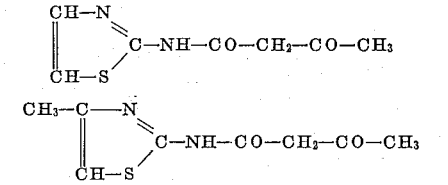

melting point 185° C.

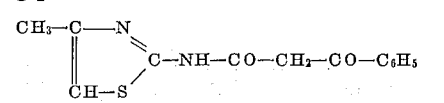

melting point 141° C.

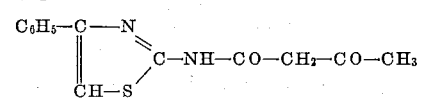

melting point 175° C.

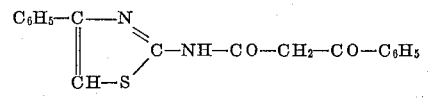

melting point 184° C.

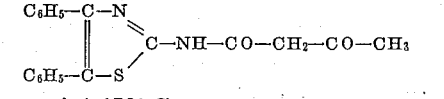

melting point 150° C.

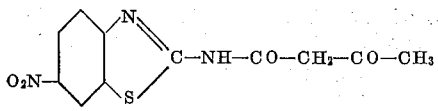

melting point 210° C.

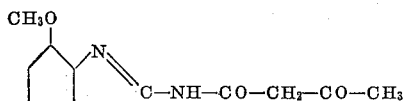

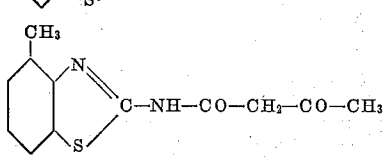

melting point 167° C.

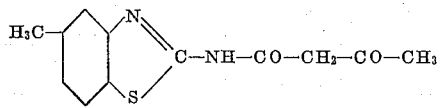

melting point 198° C.

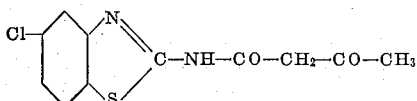

melting point 220° C.

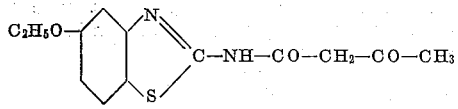

melting point 197° C.

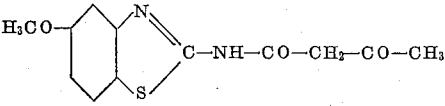

melting point 200° C.

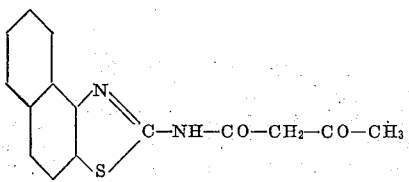

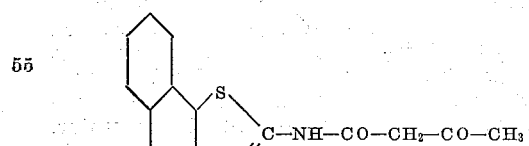

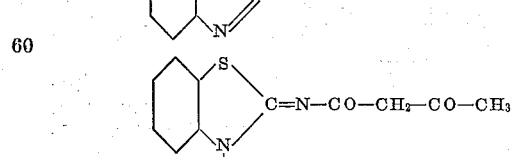

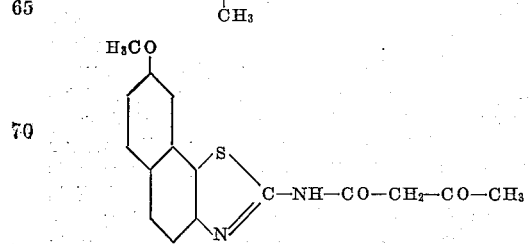

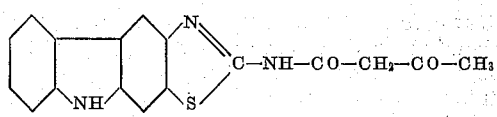

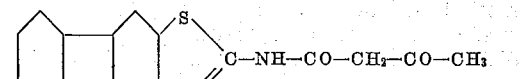

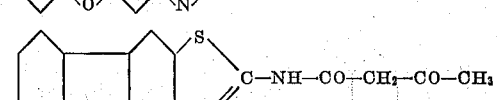

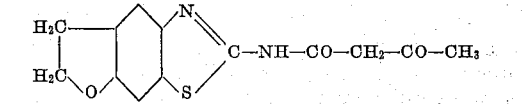

melting point 256° C.

*Example 5.*—6 grams of 2-acetoacetylamino-6-ethoxybenzothiazole are dissolved with 5 ccs. of aqueous caustic soda lye of 38° Bé. strength and 10 ccs. of Turkey red oil and water to one litre. To this solution some common salt is added, and 50 grams of cotton yarn are impregnated in this bath for about ½ hour. The impregnated yarn is squeezed and introduced for about ½ hour into a developing bath of one litre containing 1.42 grams of diazotized 1-amino-2-methyl-5-chlorobenzene, said developing bath having previously been neutralized by the addition of sodium acetate. The cotton yarn is rinsed, soaped in a boiling bath, rinsed again and dried. A clear yellow is thus obtained having excellent fastness properties and being dischargeable to a pure white. The dyestuff corresponds to the following formula:

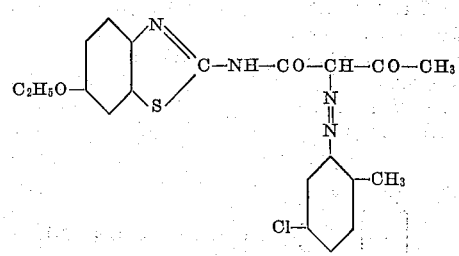

*Example 6.*—50 grams of cotton yarn are impregnated as described in Example 5. On developing in a developing bath of one litre containing 1.52 grams of diazotized 1-amino-2-nitro-4-methylbenzene, there is obtained after rinsing and soaping a reddish-yellow of good fastness properties. The dyestuff corresponds to the following formula:

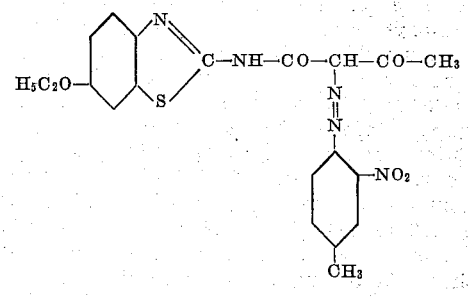

*Example 7.*—50 grams of cotton yarn are impregnated as described in Example 5. On developing in a developing bath of one litre containing 1.42 grams of diazotized 1-amino-2-methyl-4-chlorobenzene, there is obtained after rinsing and soaping a beautiful yellow which is dischargeable to a pure white. The dyestuff corresponds to the following formula:

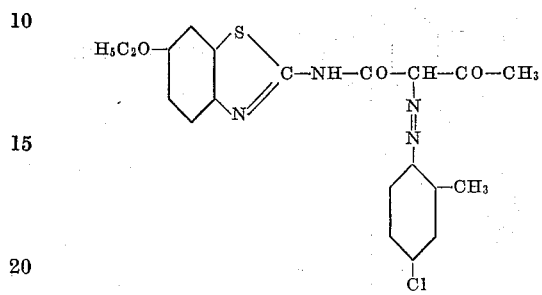

*Example 8.*—50 grams of cotton yarn are impregnated as described in Example 5. On developing in a developing bath of one litre containing 1.27 grams of diazotized 1-amino-2-chlorobenzene, there is obtained after rinsing and soaping a clear greenish-yellow of good fastness properties and good dischargeability. The dyestuff corresponds to the following formula:

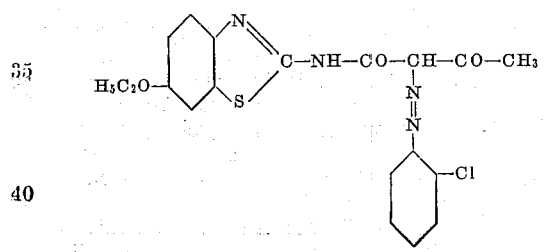

*Example 9.*—50 grams of cotton yarn are impregnated as described in Example 5. On developing in a developing bath of one litre containing 2.2 grams of diazotized 2-amino-4-chlorodiphenylether, there is obtained a clear yellow which can be discharged to a pure white. The dyestuff corresponds to the following formula:

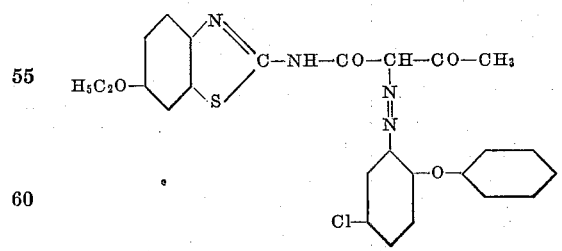

*Example 10.*—7 grams of 2-acetoacetylamino-6-methoxybenzothiazole are dissolved in the usual manner with the aid of aqueous caustic soda lye, Turkey red oil and some water, and the solution is made up with water to one litre. To the solution some Glauber's salt is added, and 50 grams of cotton yarn are impregnated in this bath for ½ hour, then rinsed and introduced for about ½ hour into a developing bath containing in one litre 1.68 grams of diazotized 1-amino-2-nitro-4-methoxybenzene. After rinsing, soaping, again rinsing and drying there is obtained a golden yellow of good fastness properties. The dyestuff corresponds to the following formula:

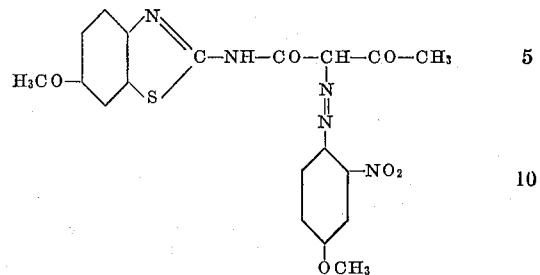

By substituting the 2-acetoacetylamino-6-methoxybenzothiazole by a corresponding quantity of 2-benzoylacetylamino-6-methoxybenzothiazole, there is obtained a dyestuff having similar properties.

*Example 11.*—5 grams of 2-acetoacetylamino-6-benzoylaminobenzothiazole are dissolved in the usual manner with the aid of aqueous caustic soda lye, Turkey red oil and some water, and made up with water to one litre. To the solution some Glauber's salt is added, and 50 grams of cotton yarn are impregnated in this bath for ½ hour, then rinsed and introduced for about ½ hour into a developing bath of one litre containing 1.42 grams of diazotized 1-amino-2-methyl-4-chlorobenzene, rinsed, soaped in a boiling bath, rinsed and dried. A greenish-yellow is thus obtained which can be discharged to a pure white. The dyestuff corresponds to the following formula:

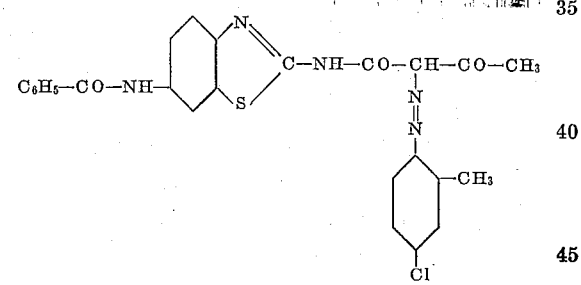

By substituting the 1-amino-2-methyl-4-chlorobenzene by 1-amino-2-methyl-5-chlorobenzene, there is obtained a dyestuff of similar properties.

*Example 12.*—34 grams of 2-benzoylacetylamino-6-ethoxybenzothiazole are dissolved in 300 grams of pyridine, thereto is added an aqueous solution containing 14.2 grams of diazotized 1-amino-2-methyl-5-chlorobenzene which has been neutralized by the addition of sodium acetate, with cooling. When the coupling is complete, the reaction liquor is poured into water, and the dyestuff which separates in form of yellow flakes is filtered. After drying, it is a reddish-yellow powder.

*Example 13.*—1.39 grams of 2-acetoacetylamino-6-ethoxybenzothiazole and 1.2 grams of the diazoamino compound from diazotized 5-chloro-2-methyl-1-aminobenzene and sarcosine are pasted with 0.7 cc. of aqueous caustic soda solution of 38° Bé. strength, 5 grams of neutral chromate solution and 5 grams of thiodiglycol, and the paste is dissolved in 25 ccs. of water. The solution is stirred into 50 grams of neutral starch-tragacanth thickener and made up with water to 100 grams. With this paste cotton tissue is printed, the cotton is dried, and the dyestuff is developed by the action of steam containing acetic or formic acid. A clear greenish-yellow is thus obtained. The dyestuff is identical with that described in Example 5.

*Example 14.*—1.39 grams of 2-acetoacetylamino-6-ethoxybenzothiazole and 2.05 grams of the diazoamino compound from diazotized 4-nitro-2-methoxy-1-aminobenzene and 1-methyl-aminobenzene-2-carboxylic acid-4-sulfonic acid are pasted with 0.7 cc. of aqueous caustic soda lye of 38° Bé. strength, 5 grams of neutral chromate solution and 5 grams of thiodiglycol, and the paste is dissolved in 25 ccs. of water. The solution is stirred into 50 grams of neutral starch-tragacanth thickener and made up with water to 100 grams. With this paste cotton tissue is printed, the cotton is dried, and the dyestuff is developed by the action of steam containing acetic or formic acid. A clear golden-yellow is thus obtained. The dyestuff corresponds to the following formula:

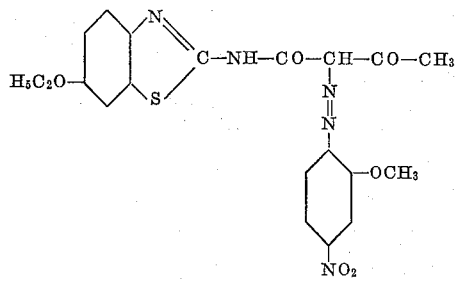

*Example 15.*—50 grams of cotton yarn are impregnated as described in Example 5. On developing in a developing bath of one litre containing 2.17 grams of diazotized 1-amino-pyrene, there is obtained after rinsing, soaping, rinsing and drying, a powerful yellowish-brown. The dyestuff corresponds to the following formula:

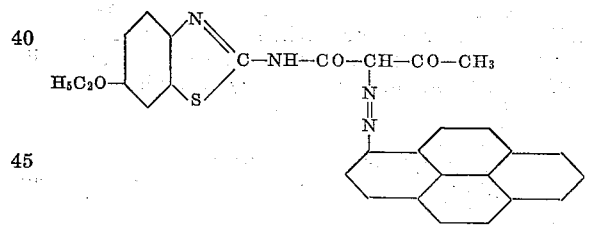

*Example 16.*—6 grams of 2-acetoacetylamino-(9'ethyl-2'.3'-carbazole)-thiazole are dissolved in hot water with 6 ccs. of aqueous caustic soda lye of 38° Bé. and 6 ccs. of Turkey red oil to 1 litre. Some common salt is added, and in this bath 50 grams of cotton yarn are impregnated for ½ hour. The yarn is squeezed and introduced for about ½ hour into a developing bath of one litre containing 1.42 grams of 1-amino-2-methyl-4-chlorobenzene. After rinsing, soaping in a boiling bath, again rinsing and drying, there is obtained a clear golden yellow of good fastness properties. The dyestuff corresponds to the following formula:

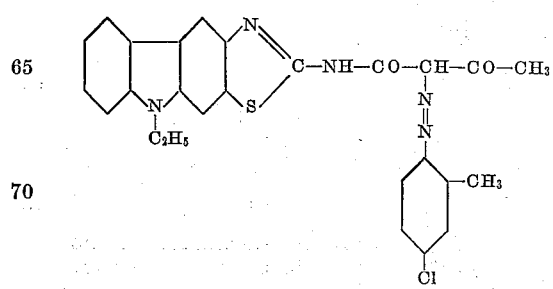

*Example 17.*—6 grams of acetoacetylamino-(3'.4'-acenaphthene)-thiazole are dissolved in hot water with 5 ccs. of aqueous caustic soda lye of 38° Bé. and 10 ccs. of Turkey red oil to one litre. 50 grams of cotton yarn are impregnated in this solution, and the dyeing is developed by introducing for ½ hour into a developing bath containing 1.42 grams of diazotized 1-amino-2-methyl-5-chlorobenzene. After rinsing, soaping, again rinsing and drying, there is obtained an orange of good fastness properties. The dyestuff corresponds to the following formula:

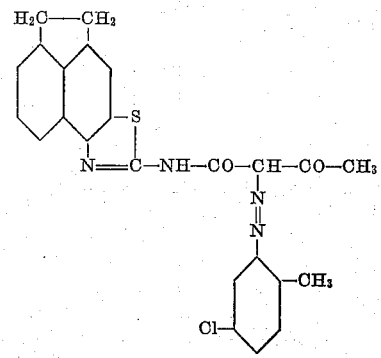

*Example 18.*—3.24 grams of the acetoacetyl compound of the formula:

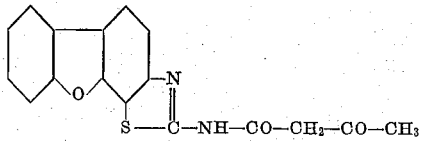

are dissolved in 50 ccs. of pyridine, and thereto is added a diazo solution prepared from 1.42 grams of 1-amino-2-methyl-4-chlorobenzene. A reddish-yellow dyestuff is thus obtained suitable for dyeing lacquers.

*Example 19.*—1.42 grams of 2-acetoacetylamino-(1'.2'-naphtho)-thiazole and 1.28 grams of the diazoamino compound from diazotized 4-chloro-2-methoxy-1-aminobenzene and sarcosine are made into a paste with 0.7 cc. of aqueous caustic soda lye of 38° Bé. strength, 5 grams of neutral chromate solution and 5 grams of thiodiglycol, and the paste is dissolved in 25 ccs. of water. The solution is stirred into 50 grams of neutral starch-tragacanth thickener and made up with water to 100 grams. With this paste cotton tissue is printed, the cotton is dried and the dyestuff is developed by the action of steam containing acetic or formic acid. A clear greenish-yellow is thus obtained. The dyestuff corresponds to the following formula:

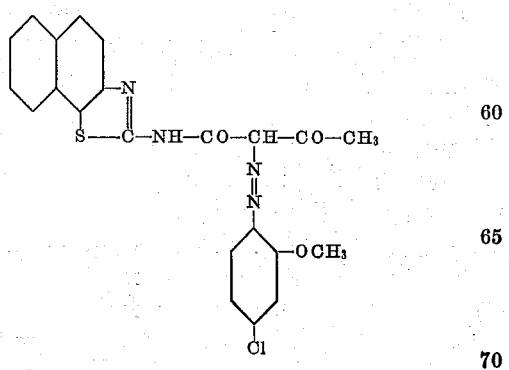

*Example 20.*—1.42 grams of 2-acetoacetylamino-(2'.1'-naphtho)-thiazole and 2.05 grams of the diazoamino compound from diazotized 4-nitro-2-methoxy-1-aminobenzene and 1-methyl-aminobenzene-2-carboxylic acid-4-sulfonic acid, yield, when printed and developed as described in Example 19, a powerful yellow. The dye-stuff corresponds to the following formula:

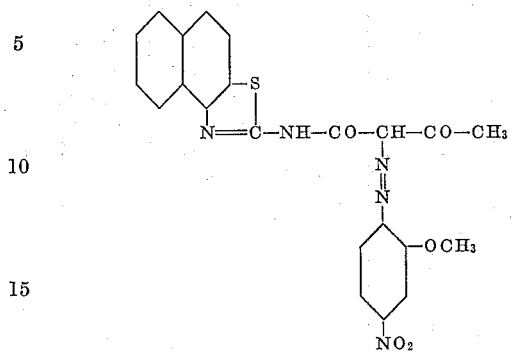

*Example 21.*—3 grams of 2-acetoacetylamino-(2'.1'-naphtho)-thiazole are dissolved with 3 ccs. of ethylalcohol, 4.5 ccs. of aqueous caustic soda solution of 38° Bé. strength and 6 ccs. of Turkey red oil in hot water to one litre. Some common salt is added to this solution, 50 grams of cotton yarn are impregnated therewith for about ½ hour, and the dyeing is developed by introducing the cotton yarn into a developing bath of one litre containing 2.6 grams of diazotized 1-methoxy-2-aminobenzene-4-sulfodiethylamide. After rinsing, soaping in a boiling bath, again rinsing and drying, there is obtained a clear greenish-yellow of excellent fastness to light. The dyestuff corresponds to the following formula:

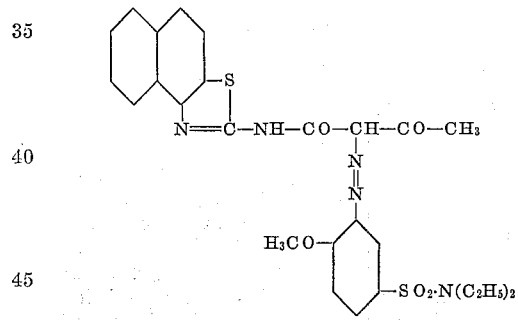

*Example 22.*—3 grams of 2-acetoacetylamino-6'-methoxy-(1'-2'-naphtho)-thiazole are dissolved with 6 ccs. of aqueous caustic soda lye of 38° Bé. and 6 ccs. of Turkey red oil in hot water to one litre. To the solution some common salt is added, and 50 grams of cotton are impregnated in the bath for ½ hour. By developing in a developing bath of one litre, containing 2.2 grams of diazotized 4-chloro-2-amino-diphenylether, there is obtained after rinsing, soaping, again rinsing and drying a clear yellow of good fastness properties. The dyestuff corresponds to the following formula:

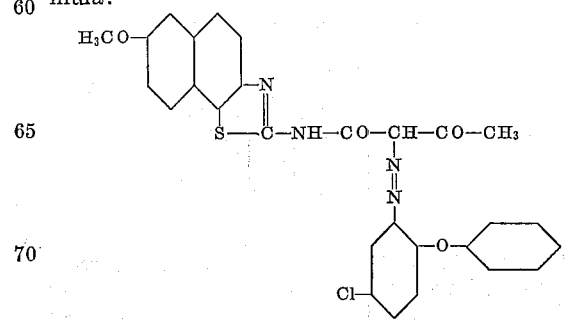

In an analogous manner the dyestuff from 2-acetoacetylamino-(1'.2'-naphtho)-thiazole and diazotized 1-amino-2-nitro-4-methoxybenzene yields a clear golden-orange of very good fastness properties. The dyestuff corresponds to the following formula:

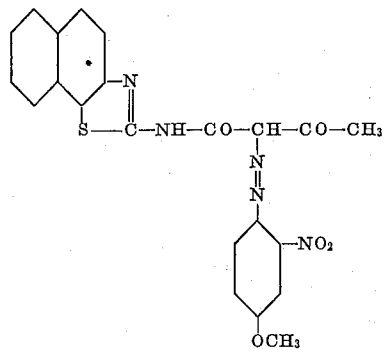

In an analogous manner the dyestuff from 2-acetoacetylamino-4-methylthiazole and diazotized 2-methoxy-4-nitro-1-aminobenzene yields a powerful reddish-yellow. The dyestuff corresponds to the following formula:

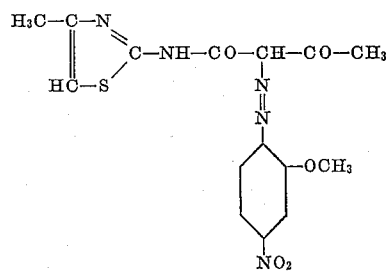

In an analogous manner 2-benzoylacetylamino-4-methylthiazole and diazotized 4-chloro-2-methyl-1-aminobenzene yield a powerful greenish yellow of good fasteness properties. The dyestuff corresponds to the following formula:

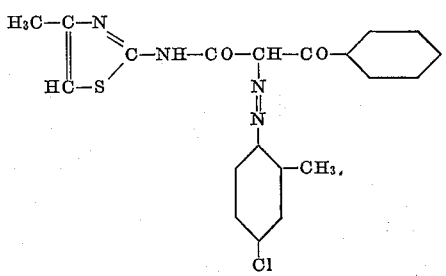

In an analogous manner 2-acetoacetylamino-4-phenylthiazole and diazotized 4-methoxy-2-nitro-1-aminobenzene yield a golden-orange of very good fastness to light. The dyestuff corresponds to the following formula:

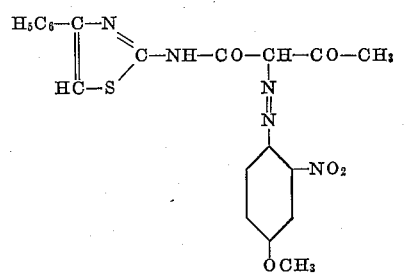

In an analogous manner 2-acetoacetylamino-4.5-diphenylthiazole and diazotized 2-methoxy-5-sulfodiethylamide-1-aminobenzene yield a greenish-yellow which can be discharged to pure white. The dyestuff corresponds to the following formula:

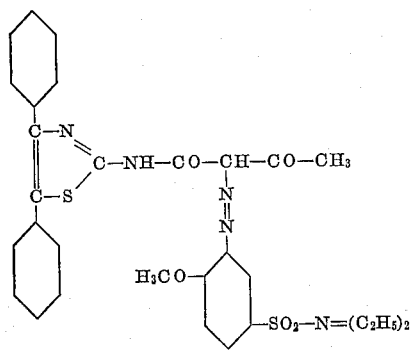

In an analogous manner 2-acetoacetylamino-4,5-diphenylthiazole and diazotized 2-chloro-5-trifluoromethyl-1-aminobenzene yield a reddish-yellow which can be discharged. The dyestuff corresponds to the following formula:

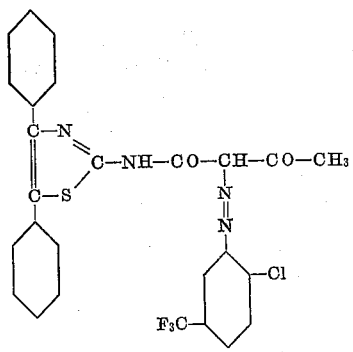

In an analogous manner 2-acetoacetylamino-6-ethoxybenzothiazole and diazotized 2-methoxy-3-aminofluorenone yield a powerful yellow. The dyestuff corresponds to the following formula:

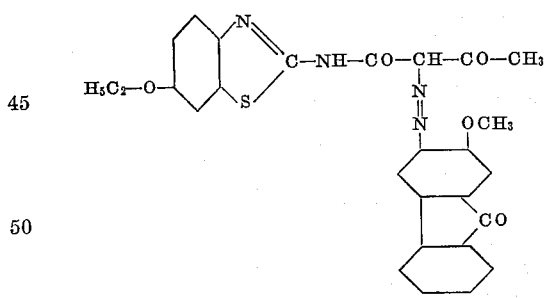

In an analogous manner 2-acetoacetylamino-6-ethoxybenzothiazole and diazotized α-naphthylamine yield a powerful yellow. The dyestuff corresponds to the following formula:

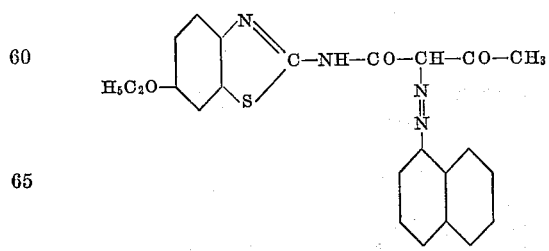

We claim:
1. The compounds of the general formula:

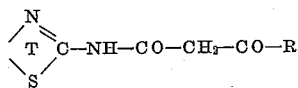

wherein

stands for the radical of a thiazole compound free from a group inducing solubility in water and R stands for a radical of the lower aliphatic or of the benzene series, being generally colorless crystalline substances, insoluble in water, soluble in organic solvents and aqueous caustic alkalies and being valuable intermediate products in the manufacture of azodyestuffs.

2. The compounds of the general formula:

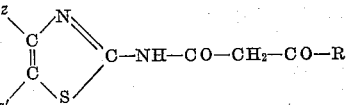

wherein z and z′ stand for hydrogen or monovalent substituents which do not cause solubility in water or

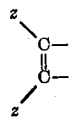

stands for an arylene radical of the benzene or naphthalene series and R stands for a radical of the lower aliphatic or of the benzene series, being generally colorless crystalline substances, insoluble in water, soluble in organic solvents and aqueous caustic alkalies and being valuable intermediate products in the manufacture of azodyestuffs.

3. The compounds of the general formula:

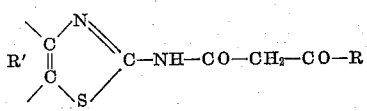

wherein R′ stands for a benzo- or naphtho-radical free from a group inducing solubility in water and R stands for a radical of the lower aliphatic or of the benzene series, being generally colorless crystalline substances, insoluble in water, soluble in organic solvents and aqueous caustic alkalies and being valuable intermediate products in the manufacture of azodyestuffs.

4. The compounds of the general formula:

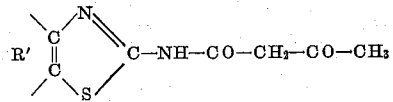

wherein R′ stands for a benzo- or naphtho-radical which may bear substituents selected from the group consisting of alkyl, alkoxy, halogen, acetylamino, being generally colorless crystalline substances, insoluble in water, soluble in organic solvents and aqueous caustic alkalies and being valuable intermediate products in the manufacture of azodyestuffs.

5. The compound of the following formula:

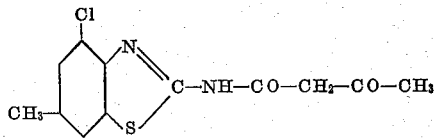

being a colorless crystalline substance melting at

204° C., insoluble in water, soluble in organic solvents and aqueous caustic alkalies and being a valuable intermediate product in the manufacture of azodyestuffs.

6. The compound of the following formula:

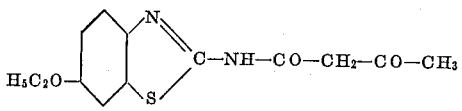

melting a 205° C., being a colorless crystalline substance, insoluble in water, soluble in organic solvents and aqueous caustic alkalies and being a valuable intermediate product in the manufacture of azodyestuffs.

7. The compound of the following formula:

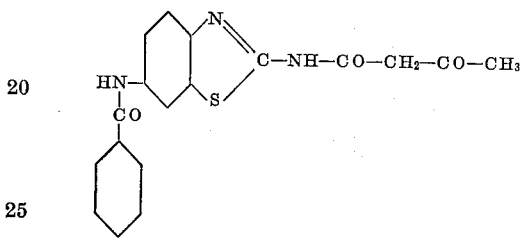

melting at 212° C. with decomposition, being a colorless crystalline substance, insoluble in water, soluble in organic solvents and aqueous caustic alkalies and being a valuable intermediate product in the manufacture of azodyestuffs.

8. The compounds of the general formula:

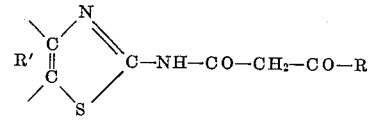

wherein R' is selected from the group consisting of benzo-, naphtho- and alkyl, alkoxy, halogen and acetylamino substituted benzo- and naphtho-radicals, and R is selected from the group consisting of lower aliphatic and benzene radicals, being generally colorless crystalline substances insoluble in water, soluble in organic solvents and aqueous caustic alkalies and being valuable intermediate products in the manufacture of azodyestuffs.

GERHARD SCHRADER.
WERNER ZERWECK.